(12) United States Patent
Brombach

(10) Patent No.: US 11,196,370 B2
(45) Date of Patent: Dec. 7, 2021

(54) METHOD FOR SUPPLYING ELECTRIC POWER BY MEANS OF A CONVERTER-CONTROLLED GENERATOR UNIT, IN PARTICULAR A WIND TURBINE

(71) Applicant: WOBBEN PROPERTIES GMBH, Aurich (DE)

(72) Inventor: Johannes Brombach, Berlin (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/622,236

(22) PCT Filed: Jun. 13, 2018

(86) PCT No.: PCT/EP2018/065568
§ 371 (c)(1),
(2) Date: Dec. 12, 2019

(87) PCT Pub. No.: WO2018/229088
PCT Pub. Date: Dec. 20, 2018

(65) Prior Publication Data
US 2020/0136540 A1    Apr. 30, 2020

(30) Foreign Application Priority Data

Jun. 13, 2017 (DE) ..................... 10 2017 112 936.7

(51) Int. Cl.
*H02P 9/10* (2006.01)
*F03D 9/25* (2016.01)
(Continued)

(52) U.S. Cl.
CPC .............. *H02P 9/105* (2013.01); *F03D 9/257* (2017.02); *H02P 9/48* (2013.01); *H02P 2101/15* (2015.01)

(58) Field of Classification Search
CPC ........ H02P 9/105; H02P 9/48; H02P 2101/15; F03D 9/257; F03D 7/0284; Y02E 10/76;
(Continued)

(56) References Cited

U.S. PATENT DOCUMENTS 8,378,515 B2    2/2013    Fortmann
8,880,236 B2 *  11/2014   Weiss .................. H02P 9/02
                                                   700/298
(Continued)

FOREIGN PATENT DOCUMENTS

DE    762134 C     1/1954
DE    3236071 A1   1/1984
(Continued)

OTHER PUBLICATIONS

Gonzalez-Longatt et al., "Effects of the Synthetic Inertia from Wind Power on the Total System Inertia after a Frequency Disturbance", Jul. 9, 2012, IEEE PES PowerAfrica 2012 Conference and Exposition, 7 pages.
(Continued)

*Primary Examiner* — Joseph Ortega
(74) *Attorney, Agent, or Firm* — Seed IP Law Group LLP

(57) ABSTRACT

A method for supplying power at a network connection point into an electric supply network having a network frequency by means of a converter-controlled generator unit, in particular a wind turbine, comprising the following steps: supplying electric power depending on a control function, wherein the electric power can comprise active and reactive power, and a selection can be made between a normal control function and at least one frequency-maintaining control function differing from the normal control function as a control function, and the normal control function is selected if it has been recognized that the electric supply network is operating in a normal state, and the frequency-
(Continued)

maintaining control function is selected if a steady-frequency operating state is present or is being prepared, wherein a steady-frequency operating state describes an operating state particularly of the electric supply network in which the network frequency is to be maintained at a constant value.

22 Claims, 4 Drawing Sheets

(51) Int. Cl.
*H02P 9/48* (2006.01)
*H02P 101/15* (2016.01)

(58) Field of Classification Search
CPC ....... Y02E 10/72; H02J 3/381; H02J 2300/20; H02J 2300/28; H02J 3/386; H02J 3/08; H02J 3/382; H02J 3/38; F05B 2270/337
See application file for complete search history.

(56) References Cited

U.S. PATENT DOCUMENTS

| | | | |
|---|---|---|---|
| 9,689,375 | B2 | 6/2017 | Jimenez Buendia |
| 9,742,191 | B2 | 8/2017 | Beekmann |
| 9,899,871 | B2 | 2/2018 | Suehiro et al. |
| 10,161,385 | B2 | 12/2018 | Busker et al. |
| 2014/0316592 | A1 | 10/2014 | Haj-Maharsi et al. |
| 2015/0260159 | A1 | 9/2015 | Buendia |
| 2017/0005473 | A1 | 1/2017 | Somani et al. |
| 2017/0163040 | A1 | 6/2017 | Bamberger et al. |
| 2018/0323618 | A1* | 11/2018 | Wagoner .................. H02J 3/01 |

FOREIGN PATENT DOCUMENTS

| | | |
|---|---|---|
| DE | 102005026062 A1 | 4/2007 |
| DE | 102007049251 A1 | 4/2009 |
| DE | 102013207264 A1 | 10/2014 |
| DE | 102015203367 A1 | 8/2015 |
| DE | 102014214151 A1 | 1/2016 |
| EP | 2918824 A1 | 9/2015 |
| JP | 2014057492 A | 3/2014 |
| RU | 2597235 C2 | 9/2016 |
| WO | 2010/055322 A2 | 5/2010 |

OTHER PUBLICATIONS

Bignucolo et al., "Impact of Distributed Generation Grid Code Requirements on Islanding Detection in LV Networks", Energies, Jan. 26, 2017, 16 pages.

* cited by examiner

METHOD FOR SUPPLYING ELECTRIC POWER BY MEANS OF A CONVERTER-CONTROLLED GENERATOR UNIT, IN PARTICULAR A WIND TURBINE

BACKGROUND

Technical Field

The present invention relates to a method for supplying electric power at a network connection point into an electric supply network with a converter-controlled generator unit, in particular by means of a wind turbine. The invention further relates to a wind energy system, in particular a wind turbine or windfarm for supplying electric power into an electric supply network.

Description of the Related Art

It is known to supply electric power into an electric supply network by means of a converter-controlled generator unit. Converter-controlled generator units of this type are, in particular, wind turbines or windfarms. However, PV systems, to mention but one further example, can also be envisaged.

The proportion of converter-controlled generator units of this type in the electric supply network, which can also be referred to below simply as the network, is increasing and the structure and behavior of the network can therefore also change, sometimes changing significantly. Converter-controlled generator units, i.e., generator units which feed into the electric supply network by means of a frequency converter or frequency inverter are currently the fastest-regulating control units in the network. They can, for example, respond very quickly and in a controlled manner to frequency changes or voltage changes or power requirements. This type of response can essentially be predefined through corresponding programming or setting. This can in turn have the result that each converter-controlled generator unit responds individually and quickly.

Converter-controlled generator units of this type thus differ significantly from large power stations which feed into the network by means of directly coupled synchronous generators. Directly coupled synchronous generators of this type tend to be characterized by a stable behavior which is essentially predefined by the physics of the synchronous generator. Fast responses are basically to be expected only insofar as they are determined by the physics of the synchronous generator.

In addition, the converter-controlled generator units are usually set up locally, i.e., they are geographically distributed over the area of the network. The individual regulating interventions of the generator units are therefore also distributed over the network. For some control and switching measures in the network, it may be important that the behavior of the network is well known here and can be predefined particularly reliably. This is important, particularly in the case of a network restoration if subnetworks are interconnected.

The higher proportion of converter-controlled generator units elicits a modified behavior of the network. The response to this can be that the network modified in this way is reanalyzed. Where appropriate, it can also be envisaged to predefine a regulating behavior for the converter-controlled generator units.

However, the problem remains that converter-controlled generator units behave differently from synchronous generators directly coupled to the network, as dictated by the system. Also the fact that converter-controlled generator units of this type are usually set up locally cannot be changed as a result. It remains the case that, due to a higher proportion of converter-controlled generator units, the network is thereby turned into a network with a lower proportion of converter-controlled generator units.

In the priority application for the present application, the German Patent and Trade Mark Office has furthermore identified the following prior art: DE 762 134 A, DE 32 36 071 A1, DE 10 2005 026 062 A1, DE 10 2013 207 264 A1, DE 10 2014 214 151 A1, DE 10 2015 203 367 A1 and US 2015/0260159 A1.

BRIEF SUMMARY

Provided are techniques for enabling a stabilization of the network, even with a high proportion of converter-controlled generator units in the network, during interventions in the network, in particular the connection of subnetworks in the event of a network restoration.

A method for supplying electric power at a network connection point into an electric supply network by means of a converter-controlled generator unit is accordingly provided. The electric supply network has a network frequency.

The supply of electric power is provided depending on a control function, wherein the electric power can comprise active and reactive power. It is therefore proposed to supply active and/or reactive power depending on a control function. It must be taken into consideration, in particular, that the control function establishes a relationship between the supplied power and a state in the electric supply network. Such a state of the electric supply network may be a voltage level, voltage change, frequency level, frequency change or a signal of a network operator, to mention but a few examples.

It is then proposed that a selection can be made between a normal control function and at least one frequency-maintaining control function differing from the normal control function as a control function. The normal control function is selected if it has been recognized that the electric supply network is operating in a normal state. Here, a normal state of this type is a state of the electric supply network in which the converter-controlled generator units and also other generator units in the electric supply network essentially operate in such a way that they feed electric power into the network in order to supply consumers, without special circumstances such as a network restoration having to be considered. In the normal state, however, fluctuations in the network frequency or fluctuations in the voltage in the electric supply network can occur, even to an extent that the converter-controlled generator units must respond thereto. The normal control function may thus also entail, for example, responding to an increase in the network frequency with a reduction in the supplied active power, to mention but one example.

The frequency-maintaining control function is selected if a steady-frequency operating state is present or is being prepared. A steady-frequency operating state of this type is an operating state of the electric supply network in which the network frequency is to be maintained at a constant value. This can essentially also occur in a network section which is not part of the electric supply network at that time. However, this steady-frequency operating state is essentially an operating state of the electric supply network.

A steady-frequency operating state of this type can be predefined by an operator of the electric supply network, also referred to as a network operator, or by a different central control unit. In this respect, the network operator can also supply corresponding information to the converter-controlled generator unit in preparation for a situation planned by it in which it requires the steady-frequency operating state. As a result, it can already select or instigate the selection of the frequency-maintaining control function also in preparation for an operating state of this type.

The steady-frequency operating state is an operating state in which the network frequency is maintained at a constant value. Obviously, an essentially constant network frequency is, in principle, always to be provided, but this can and is allowed to fluctuate within certain limits. Converter-controlled generator units in particular, particularly if they can function in parallel network operation, normally adapt to this frequency. This means that they constantly monitor the network frequency and moreover the associated phase also, and adapt their power thereto with a corresponding frequency and phase for the supply. In this respect, this behavior is also the behavior of the normal control function and if this behavior is required, the normal state is then present.

However, in the steady-frequency operating state, the network frequency is intended instead to be maintained at a constant value and this can mean that the converter-controlled generator unit does not also attempt to track a continuously monitored network frequency, but to feed in with a fixed frequency value, or at least requires a particularly substantial outlay to maintain the frequency. Conversely, by way of distinction, the normal state can essentially describe all operating states which do not relate to the steady-frequency operating state.

It is preferably proposed that the frequency-maintaining control function controls the power at least depending on a network frequency of the electric supply network in such a way that the network frequency is supported, wherein the network-maintaining control function is designed and/or parameterized in such a way that it supports the network frequency more strongly than the normal control function supports the network frequency.

As already mentioned above, the normal control function may entail a frequency-dependent regulation or control, such as, for example, a frequency-dependent power control, wherein a control or control function can essentially also include a regulation or regulating function. A control of this type thus provides a response to a frequency change in the network frequency which is intended to counteract this frequency change. One important example of this entails reducing the supplied power in the event of a frequency increase and increasing the supplied power in the event of a frequency reduction. This counteracts the monitored frequency change or the monitored excessively high or excessively low frequency value. This is normally already provided for the normal control function.

For the frequency-maintaining control function, it is now proposed that this control behavior is more predominantly selected. In the simplest case, this can mean an increase in a gain factor or an increase in the slope of the control statics. If, for example, a power increase of 5% is provided in the normal control function for a frequency drop of 0.1 percent, an increase in the supplied power by 20 percent can then be provided in the frequency-maintaining control function, to mention one illustrative example.

However, it is also conceivable that a frequency-dependent control function of this type, i.e., a control function to maintain the network frequency, operates quite fundamentally differently. A deadband range, for example, which provides no response whatsoever to slight deviations in the network frequency from a nominal network frequency can be provided in the normal control function, whereas, for the frequency-maintaining control function, it can be provided to intervene in the event of any frequency change. For the frequency-maintaining control function, it can also be provided to take as a basis the existing frequency value or an externally predefined frequency value which may differ from the nominal network frequency, to mention a further example.

In particular, maintaining the network frequency at a constant value in the frequency-maintaining control function is the primary control objective, not only for this embodiment.

The selection of the frequency-maintaining control function may thus also entail, or the frequency-maintaining control function may entail a lessening or even temporary suspension of other network-state-dependent controls. The normal control function can, for example, also provide a voltage-dependent reactive power supply which supplies or modifies a reactive power depending on the voltage at the network connection point. For this purpose, it can be provided that this voltage-dependent reactive power supply is suspended for the frequency-maintaining control function. As a result, the full control capability of the converter-controlled generator unit can be made available for the frequency support. In particular, the capability of the control intervention of each converter-controlled generator unit can be limited by the amplitude, in the sense of an effective value, of the supplied current. The possible proportion of an active current can be limited by a reactive power supply and therefore a supply of a reactive current, which consequently also limits the active power. This can therefore be circumvented during the frequency-maintaining control function in that a reactive power supply can be dispensed with at that time and the entire current which can be supplied is active current, to mention one example.

A frequency-maintaining control function of this type or a steady-frequency operating state of this type is required particularly for the interconnection of two separate subnetworks of the electric supply network. If these two subnetworks are interconnected, it is particularly important that they then have the same network frequency. A procedure of this type for interconnecting two such network sections is comparatively short. It can thus be sufficient to eliminate otherwise necessary controls of the electric supply network or to move these into the background and primarily provide frequency support for the short procedure of interconnecting the two separate network sections. Converter-controlled generator units can support this by means of the proposed solution. The support is obviously particularly efficient since as many as possible and as powerful as possible converter-controlled generator units operate as proposed in the relevant area of the electric supply network.

It has also been recognized that this stabilization of the network frequency can be achieved not only through comparatively slow-running large power stations, i.e., directly coupled synchronous generators, but instead the fast control capability converter-controlled generator units can contribute significantly through selection of the corresponding frequency-maintaining control function. For this purpose, participating, albeit locally distributed, converter-controlled generator units do not need to be controlled with detailed coordination. It can suffice that the converter-controlled generator units switch over to the proposed control behavior adapted to the steady-frequency operating state.

According to one embodiment, it is proposed that the frequency-maintaining control function entails an emulation of a behavior of a synchronous machine with a virtual rotating oscillating weight with a moment of inertia. To do this, it is proposed that the power is supplied at a frequency which is predefined as proportional to a rotational speed of the virtual rotating oscillating weight. The virtual moment of inertia is preferably settable. In particular, a rotating oscillating weight in a directly coupled synchronous machine is the reason for the comparatively inert behavior of this synchronous machine and therefore the comparatively inert behavior of the supply frequency generated by this synchronous machine.

This relationship is taken here as a basis, wherein a virtually rotating oscillating weight with a virtual moment of inertia is selected instead of an actually rotating oscillating weight. For this purpose, a torsional moment which may be proportional to a power difference can be integrated continuously into a frequency, for example in a computing program. The power difference can correspond to a change in the supplied power.

The torsional-moment-dependent frequency change thus depends on the integration time constant and this corresponds to the inverse of the virtual moment of inertia. The greater the virtual moment of inertia selected, the smaller the integration time constant therefore is, and the less or more slowly the frequency therefore changes. A constant frequency can thereby be maintained. In particular, the power is supplied here at a frequency which is predefined by the rotational speed of the virtual oscillating weight. The frequency of the power does not therefore simply track the frequency in the network here, but the supply frequency can be maintained at least partially at its value.

The virtual moment of inertia is preferably settable and a greater virtual moment of inertia is set for the frequency-maintaining control function than for the normal control function. It should be noted here that the power can change due to the at least partial maintenance of the frequency as the power is supplied and can therefore affect the virtual rotational speed and therefore the supplied frequency. If the virtual moment of inertia has a low value, the frequency is therefore only weakly maintained, resulting in an effective frequency tracking which is provided in the normal state or which can correspond to a behavior of the normal control function. Due to the increase in the virtual moment of inertia, particularly due to a significant increase in the virtual moment of inertia, the frequency is more strongly maintained in this respect and it can be so strongly maintained that this maintenance of the frequency dominates and a strong frequency support is in this respect achieved.

The virtual moment of inertia of the frequency-maintaining control function is preferably at least twice as great compared with the normal control function. It is preferably at least 5 times as great and, in particular, it is proposed that it is at least 10 times as great. Such significant increases in the virtual moment of inertia are thus proposed, as a result of which the frequency support becomes dominant. The steady-frequency operating state can be effectively supported as a result.

According to one embodiment, it is proposed that
a current having a frequency and phase is fed in for the power supply,
the frequency and optionally the phase of the supplied current are predefined by a virtual weight rotating at a virtual rotational speed $\omega_v$,
the rotating virtual weight has a settable virtual moment of inertia $J_v$, so that a virtual kinetic energy $E_v$ is stored in the rotating weight, according to the formula:

$$E_v = \tfrac{1}{2} J_v \omega_v^2$$

wherein the frequency f of the supplied current is proportional to the virtual rotational speed $\omega_v$, in particular with the relationship: $\omega_v = 2\pi f$, and
the virtual kinetic energy is modified depending on a power deviation, wherein the power deviation quantifies the extent to which the supplied active power is exceeded above an initial active power or above a predefined active power, and
the virtual kinetic energy is modified, in particular, in such a way that it is modified by the amount of the deviation power integrated over time and thus modifies its virtual rotational speed accordingly, i.e., according to the formula $Ev = \tfrac{1}{2} J_v \omega_v^2$.

This embodiment thus offers a facility for setting the supplied frequency depending on a rotating virtual weight or for feeding power at a corresponding frequency. A power deviation results here in a modification of the virtual kinetic energy, from which a change in the rotational speed and therefore the supplied frequency can arise. The inertia of such frequency changes can be set by setting the virtual moment of inertia. The greater it is selected, the more inert this system is and the more strongly the frequency is maintained.

According to one embodiment, it is proposed that
an actual frequency is monitored, particularly at the network connection point,
a frequency deviation is determined as a deviation of the monitored actual frequency from a reference frequency,
the frequency-maintaining control function predefines a power, in particular an active power, which is to be supplied depending on the frequency deviation via a controller function with a settable controller gain, and
the controller gain is predefined in such a way that the network frequency is more strongly supported than through the use of the normal control function.

According to this embodiment, the primary control objective is to maintain the network frequency as much as possible at a constant value through a corresponding adaptation of a controller gain. A power supply depending on the frequency deviation is present here. This dependency is implemented via the controller function with a settable controller gain. A very high amount of controller gain is selected accordingly for the frequency-maintaining control function, so that a substantial change in the active power supply is effected even in the event of a minor frequency deviation.

It is provided here, in particular, that the frequency-maintaining control function and the normal control function have implemented the same controller function with which the power to be supplied is predefined depending on the frequency deviation. However, in the case of the frequency-maintaining control function, the amount of the controller gain is greater, in particular significantly greater, than in the case of the normal control function. The frequency support can thus be improved simply via the setting of this controller gain and, in particular, it can thereby be made a primary control objective through a correspondingly substantially modified controller gain.

It is preferably provided that the normal control function also predefines a power, in particular an active power, which is to be supplied depending on the frequency deviation via a controller function with a settable controller gain, wherein the controller gain of the frequency-maintaining control is set in comparison with the normal control function at least to a twofold, preferably at least to a fivefold and, in particular, at least to a tenfold value.

According to one design, an integral component in the controller is proposed for the frequency-maintaining control function in order to achieve a stationary precision of the frequency. If an integral component is already present in the normal control function, it is proposed to increase, in particular at least to double, the integral component for the frequency-maintaining control function.

At least a doubled, in particular at least a fivefold and in particular at least a tenfold value of the controller gain is thus provided for the frequency-maintaining control. The controller gain of the frequency-maintaining control is thereby significantly increased compared to the controller gain of the normal control function. The controller gain is intended to be significantly increased accordingly.

According to a further embodiment, it is proposed that the frequency-maintaining control is used for a predetermined steady-frequency time period only and the predetermined steady-frequency time period is less than 1 minute, preferably less than 30 seconds and, in particular, less than 15 seconds.

The frequency-maintaining control is therefore provided for a very short time period only, i.e., in particular, less than one minute, less than 30 seconds or even less than 15 seconds. As a result, in particular, a described switching operation can be supported or the network can be supported during a switching operation of this type. Since this frequency-maintaining control function is applied for a short time only, a very substantial outlay can thus be required to maintain a constant frequency, which is the primary control objective for this short time period. In particular, large quantities of energy such as, for example, from the oscillating weight, particularly of the aerodynamic rotor of the wind turbine or the plurality of wind turbines in the case of a windfarm, may possibly also be used. Such a kinetic energy of an oscillating weight can be quickly consumed, but may be sufficient for the aforementioned short time period in which this external control function is required.

It is also preferably proposed that the converter-controlled generator unit comprises or is at least one wind turbine with an aerodynamic rotor, the frequency-maintaining control consumes more power than the normal control function to support the network frequency so that additional power can be fed into or drawn from the electric network for a or the steady-frequency time period, and the additional power or a part thereof is obtained from kinetic energy of the rotor, or is stored as kinetic energy in the rotor.

Energy of the oscillating weight of the aerodynamic rotor of the wind turbine or the plurality of wind turbines in the case of a windfarm is thereby used and the potential of providable energy for the frequency-maintaining control is thus significantly increased. In particular, it also becomes possible as a result to provide any required support power beyond the power obtainable from the wind at that time.

It is preferably provided that the presently prevailing value of the monitored network frequency or a mean value of a monitored frequency is selected as a frequency reference value in the event of a switchover from the normal control function to the frequency-maintaining control function, in particular that the frequency reference value selected in this way is specified as a constant value for the entire duration of a or the steady-frequency time period and adjustment to this frequency reference value with the frequency-maintaining control function, in particular for the entire duration of the steady-frequency time period.

It is thus proposed here to take as an underlying value the instantaneously monitored frequency value, which may also entail a mean frequency value or an otherwise filtered frequency value, continuously for this time period of primary frequency support. The control attempts to maintain this frequency value and can thereby achieve a stabilization of the network frequency. In particular, the monitored frequency of the network frequency at the network connection point is used here. In any case, the current frequency is essentially maintained at its current value as a result. A switchover to the frequency-maintaining control function can be performed particularly by means of a signal from the network operator, or a different signal, and the presently prevailing frequency is thereby maintained.

This is an effective proposal particularly if as many as possible, in the ideal case all, converter-controlled supply units of the network section concerned perform such a control. In this case, the frequency can be maintained at this last value. Particularly in the case where the subnetwork concerned to which the converter-controlled supply unit is also connected comprises no directly coupled synchronous generator, all participating converter-controlled supply units can thereby be set to the same adjusting frequency value. No common reference value which is transmitted to all converter-controlled supply units concerned is required for this purpose, but only a common time signal for start-up. It is also preferably proposed accordingly that a central controller transmits a common start-up signal to a plurality of converter-controlled generator units.

Since this frequency value is specified for the entire time period of the proposed frequency support, a uniform stable frequency reference value is thereby obtained as a reference control value for all converter-controlled generator units concerned.

The electric supply network is preferably divided into subnetworks and the frequency-maintaining control function is selected if such subnetworks are intended to be connected. Particularly in such a case of connection of subnetworks of this type, which may be relevant particularly in the event of a network restoration, the frequency is also maintained by the converter-controlled generator units and the two subnetworks can be connected at the most constant frequency possible.

According to a further embodiment, it is proposed that a frequency-adapting control function is additionally provided in order to match the frequency of a subnetwork or one of the subnetworks to the frequency of a second subnetwork or a second of the subnetworks, and the frequency-adapting control function is selected initially following the normal control function in preparation for the steady-frequency operating state in order to carry out the matching of the frequencies and then, when the frequencies are matched, to select the frequency-maintaining control function.

A frequency-adapting control function is thus provided. This frequency-adapting control function is intended at least to adapt the frequency of one subnetwork to the frequency of the other subnetwork. A frequency-adapting control function of this type is preferably provided in each of the subnetworks so that they converge with one another. However, for the control of a converter-controlled generator unit, this means that this frequency of the subnetwork section to which it is connected matches the frequency of the other subnetwork, i.e., its subnetwork to which the connection is to be established.

The frequency-adapting control function can operate, for example, in such a way that it obtains a frequency value from the other subnetwork, or that both subnetworks receive a common frequency signal from a network operator responsible for both subnetworks. The frequency-adapting control function is thus provided particularly if the frequencies of both subnetworks to be connected are not identical at that time. A frequency between the current frequencies of both subnetworks is then preferably selected. However, it is also conceivable to provide a different frequency, for example the nominal network frequency, as the target frequency. However, a nominal network frequency does not need to be selected if, for example, the frequencies of both subnetworks are significantly below this nominal network frequency. The frequency-adapting control function can thus differ, for example, from the normal control function and the frequency-maintaining control function in that an external frequency value is predefined for it which in turn does not correspond to the present frequency value of the network frequency.

The converter-controlled generator unit is thus initially operated in the normal state. The connection of two subnetworks is then intended to be performed and the frequency-adapting control function is initially selected in order to match the frequencies of both networks. If this has been successful, the frequency-maintaining control function can finally be selected.

It is preferably proposed that at least the two subnetworks are interconnected following the selection of the frequency-maintaining control function and, in particular, the steps of initially selecting the frequency-maintaining control function following the normal control function in preparation for the steady-frequency operating state, then, when the frequencies are matched, selecting the frequency-maintaining control function and, optionally following the selection of the frequency-maintaining control function, interconnecting at least the two subnetworks, are carried out in an automated manner.

After the frequency-maintaining control function has been selected, both subnetworks can therefore then be connected. This should also be done as soon as possible so that the frequency-maintaining control function is not active for too long.

In order to guarantee a prompt performance also, it is thus proposed to carry out the aforementioned steps in an automated manner. Finally, the underlying criteria can be evaluated with a computer. An automated control of this type is preferably carried out by a central controller, such as, for example, a network operator. A central controller is therefore proposed which is responsible for many converter-controlled generator units. Nevertheless, particularly the coordination outlay and the need for data transmission from a central control unit of this type to the individual converter-controlled generator units are comparatively small. A central control unit of this type in each case essentially only needs to predefine switchover signals, i.e., first a switchover signal to switch from the normal control function to the frequency-adapting control function, then from the frequency-adapting control function to the frequency-maintaining control function and finally it can transmit a signal to connect the subnetworks or then perform this connection itself.

A connection or reconnection of two separate subnetworks is therefore advantageously possible, even with a large number of converter-controlled generator units.

Particularly since the converter-controlled generator units normally have some control functions and control devices which can frequently be controlled from outside, or can at least receive information from outside, such a procedure of connecting subnetworks can readily be performed in an automated manner.

According to one embodiment, it is proposed that a transition function is provided to predefine or control a change from the frequency-maintaining control function to the normal control function and/or from the normal control function to the frequency-maintaining control function, wherein the transition function in each case preferably specifies a time characteristic in order to change settings, in particular parameters, so that the settings or parameters can change along this time characteristic. With this proposal, it can also be achieved that network regulations affected thereby can closely follow the changes.

It has been recognized here, in particular, that the frequency-maintaining control function is no longer required following the connection of two separate network sections, since the frequency no longer needs to be maintained to a particular extent, but the network may still be prone to interference directly following the connection and a hard switchover from the frequency-maintaining control function back to the normal control function can jeopardize the stability of the network. A transition can be predefined by means of the transition function in order to avoid this hard switching.

However, a transition function of this type is also advantageous for the change from the normal control function to the frequency-maintaining control function. Although the network is functioning quite stably at that time, even small fluctuations are still unwanted for the steady frequency which is to be prepared. The transition function can thus be used in both directions, wherein it is, however, preferably parameterized differently for each direction of change.

A time characteristic is specified in each case for the change of settings, in particular the change of parameters, so that the settings or parameters in each case change along a characteristic of this type. Their change can thereby be predefined and abrupt changes can be avoided. The time characteristic indicates the change over time of the respective value of the setting or parameter.

The transition function can essentially be used accordingly for a transition from the normal control function to the frequency-adapting control function also.

The method is preferably characterized in that the transition function predefines a transition time period for the change, wherein the time period is preferably in the range from 1 to 10 seconds, in particular 2 to 5 seconds, and settings, at least parameters, differing over the transition time period between the frequency-maintaining control function and the normal control function change constantly, preferably strictly uniformly, in particular linearly, in each case from their respective value in the frequency-maintaining control function to their respective value in the normal control function, or vice versa, and/or limit gradients are predefined for the transition time period for changes in reactive power outputs and/or active power outputs of the converter-controlled generator units, so that reactive power outputs and/or active power outputs change in terms of their amount at most so quickly that the limit gradients are not exceeded.

It is thus proposed that parameters change, in particular linearly, from one value to the other. An otherwise strictly uniform change is also conceivable, for example via a spline function with network points. A linear change of this type or the spline function mentioned by way of example are in each case examples of a time characteristic.

In any event, at least no abrupt change is to be undertaken. However, a non-abrupt change of this type which is pre-definable by the transition function is conceivable for other characteristics and different structures also. If the structures differ between the frequency-maintaining control function and the normal control function, for example in that one structure has an I-component and the other does not, the I-component can be added or removed by means of a transition weighting factor which changes from zero to one or vice versa. Essentially any structural elements can be added or removed in this way without hard switching.

It is furthermore or alternatively proposed to limit reactive power changes and/or active power changes. This concerns the reactive power output or active power output of the converter-controlled generator unit, but can essentially also concern a reactive power consumption or active power consumption by the converter-controlled generator unit, i.e., a negative output.

It has been recognized here, in particular, that substantial changes in the reactive power output and/or active power output can occur due to the frequency-maintaining control function. In the normal control function, the changes in these values would be reversed, which could result in substantial changes which could be so great that stability problems could develop. This is prevented by predefining limit gradients. Each limit gradient thus indicates a maximum permissible change in the reactive power or active power over time. The values of the limit gradients are preferably different for the reactive power output and the active power output.

However, limit gradients of this type may also be appropriate for a change from the normal control function to the frequency-maintaining control function, since the different control functions can result in different reactive power outputs and/or active power outputs and an excessively fast change may then also be unfavorable for the frequency-maintaining control function.

The non-abrupt transition of the characteristics and also the predefinition of the limit gradients can also be combined, for example by implementing both proposals simultaneously. In the ideal case, the limit gradients would not be attained at all through the non-abrupt transition and could in this respect act as an additional safety measure.

For this purpose, it is also preferably proposed that the frequency-maintaining control function and optionally the normal control function and, if necessary, the frequency-adapting control function are selected depending at least on an external request, in particular from a network operator, wherein the generator unit can preferably receive one or more such external requests via an interface, in particular a data interface.

An advantageous coordination of a plurality of converter-controlled generator units is thereby possible. As a result, the network operator can furthermore use the converter-controlled generator units which are controllable in this way for the control of its electric supply network, in particular it can use them here also for the often critical connection of two subnetworks.

According to one embodiment, it is proposed that the converter-controlled generator unit switches over from a current-impressing mode to a voltage-impressing mode when selecting the frequency-maintaining function or, at least if a plurality of converter units or inverter units are used, switches at least one or more of these converter units or inverter units over to a voltage-impressing mode.

It is thus proposed to provide a voltage-impressing mode for the frequency-maintaining function, or at least to operate some converters or inverters in the voltage-impressing mode.

The underlying notion here is that a voltage-impressing mode can respond much more quickly to deviations in the instantaneous voltage values and can therefore respond much more quickly to the slightest frequency deviations, i.e., which manifest themselves in corresponding voltage deviations. To do this, the converter-controlled generator unit does not necessarily have to be switched over in its entirety to a voltage-impressing mode. It can even be advantageous if a voltage-impressing mode is provided at least partially or more than in the case of the normal control function. Even if the converter-controlled generator unit comprises one wind turbine only, a switchover of only some of the converters or inverters that are used to a voltage-impressing mode can also be performed in this wind turbine. The same applies to a windfarm if it forms the converter-controlled generator unit. It can then be provided that some of the wind turbines operate in voltage-impressing mode or that a plurality of converters or inverters are present there also in each wind turbine, and some of the converters or inverters in each case switch over to voltage-impressing mode in the wind turbines.

A wind energy system is also proposed. A wind energy system of this type may be a wind turbine or a windfarm which comprises a plurality of wind turbines. A wind energy system of this type is prepared in order to supply electric power as a converter-controlled generator unit at a network connection point into an electric supply network having a network frequency. The wind energy system comprises:
  a supply unit to supply electric power depending on a control function, wherein the electric power can comprise active and reactive power,
  a control unit in which the control function is implemented and which is prepared so that a selection can be made between a normal control function and at least one frequency-maintaining control function differing from the normal control function as a control function, wherein the control unit is prepared so that
    the normal control function is selected if it has been recognized that the electric supply network is operating in a normal state, and
    the frequency-maintaining control function is selected if a steady-frequency operating state is present or is being prepared, wherein a steady-operating state describes an operating state, particularly of the electric supply network, in which the network frequency is to be maintained at a constant value.

This wind energy system is thus prepared, in particular, in order to employ or implement at least one of the methods described above. A wind energy system of this type can preferably also have a storage device to store electric energy. Electric energy of this type can then be used by the frequency-maintaining control function. Particularly the frequency-maintaining control function can briefly and suddenly require a comparatively large quantity of energy in order to implement its regulating objective. The frequency maintenance can in fact also be defined here as the regulating objective. An energy store of this type only needs to be dimensioned accordingly as large enough to be able to provide energy for the frequency-maintaining function and therefore also for a short steady-frequency time period only. The energy store is preferably designed as a battery or battery bank and can therefore directly store electric energy.

According to one embodiment, it is proposed that an interface, in particular a data interface, is provided in order to receive at least one request for the selection of a control function. A corresponding signal can thus be received via this data interface, for example from a network operator or from a different central control unit.

The wind energy system is preferably prepared in order to carry out a method according to at least one embodiment described above.

BRIEF DESCRIPTION OF THE SEVERAL VIEWS OF THE DRAWINGS

The invention is described in detail below by way of example on the basis of example embodiments with reference to the accompanying figures.

DETAILED DESCRIPTION

Figure 1:
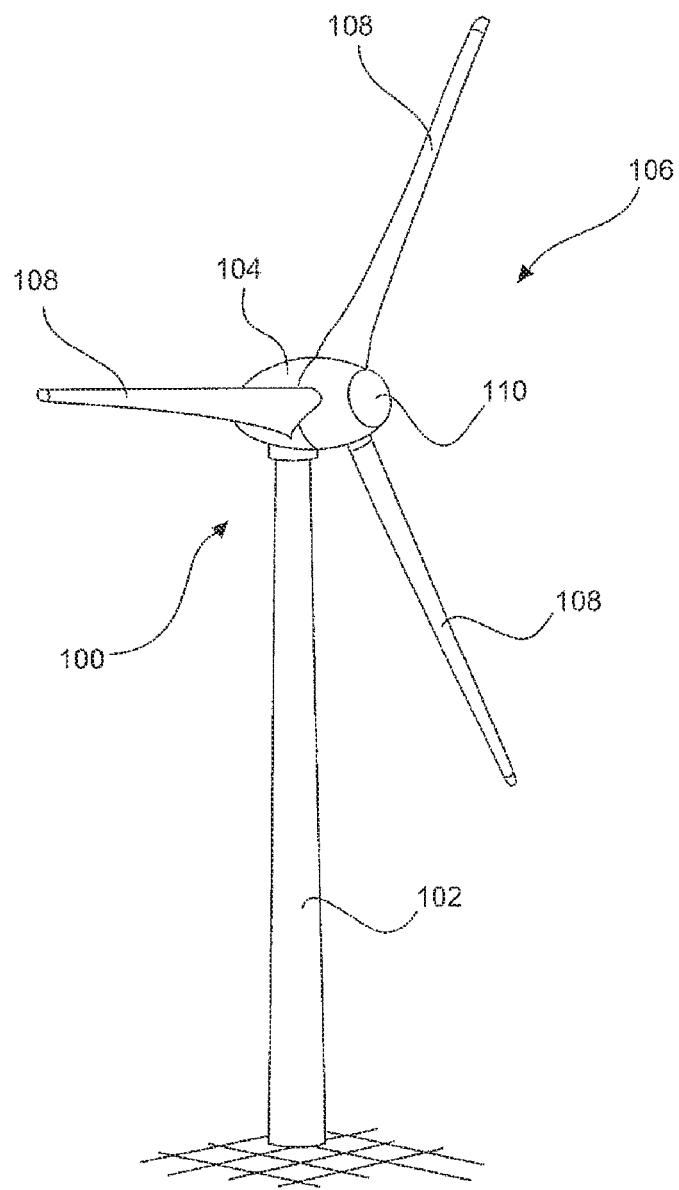
FIG. 1 shows a wind turbine in a perspective view.

FIG. 1 shows a wind turbine 100 with a tower 102 and a nacelle 104. A rotor 106 with three rotor blades 108 and a spinner 110 is disposed on the nacelle 104. During operation, the rotor 106 is set in rotational motion by the wind and thereby drives a generator in the nacelle 104.

Figure 2:
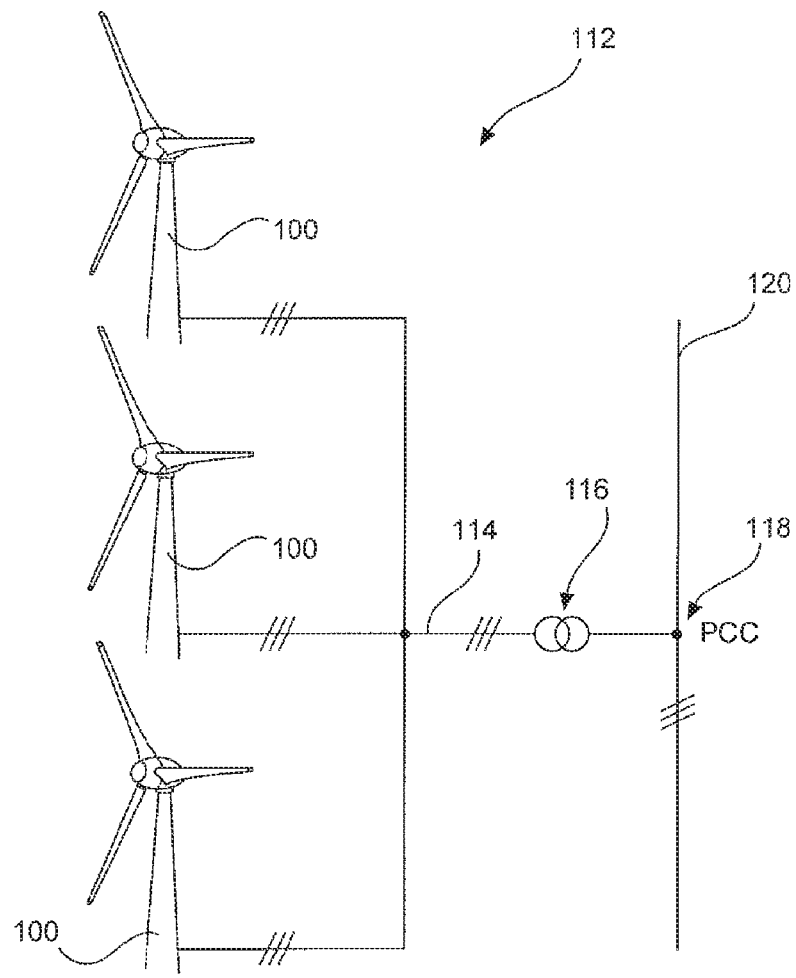
FIG. 2 shows a windfarm in a schematic view.

FIG. 2 shows a windfarm 112 with, by way of example, three wind turbines 100, which may be identical or different. The three wind turbines 100 thus represent essentially any number of wind turbines of a windfarm 112. The wind turbines 100 provide their power, i.e., in particular, the generated current, via an electric windfarm network 114. The currents or powers of the individual wind turbines 100 generated in each case are added together and a transformer 116 is usually provided to step up the voltage in the windfarm and then feed it at the feed-in point 118, which is also generally referred to as the PCC, into the supply network 120. FIG. 2 is only a simplified representation of a windfarm 112 which, for example, shows no controller, although a controller is obviously present. The windfarm network 114 can also, for example, be designed differently in that, for example, a transformer is also present at the output of each wind turbine 100, to mention but one other example embodiment.

Figure 3:
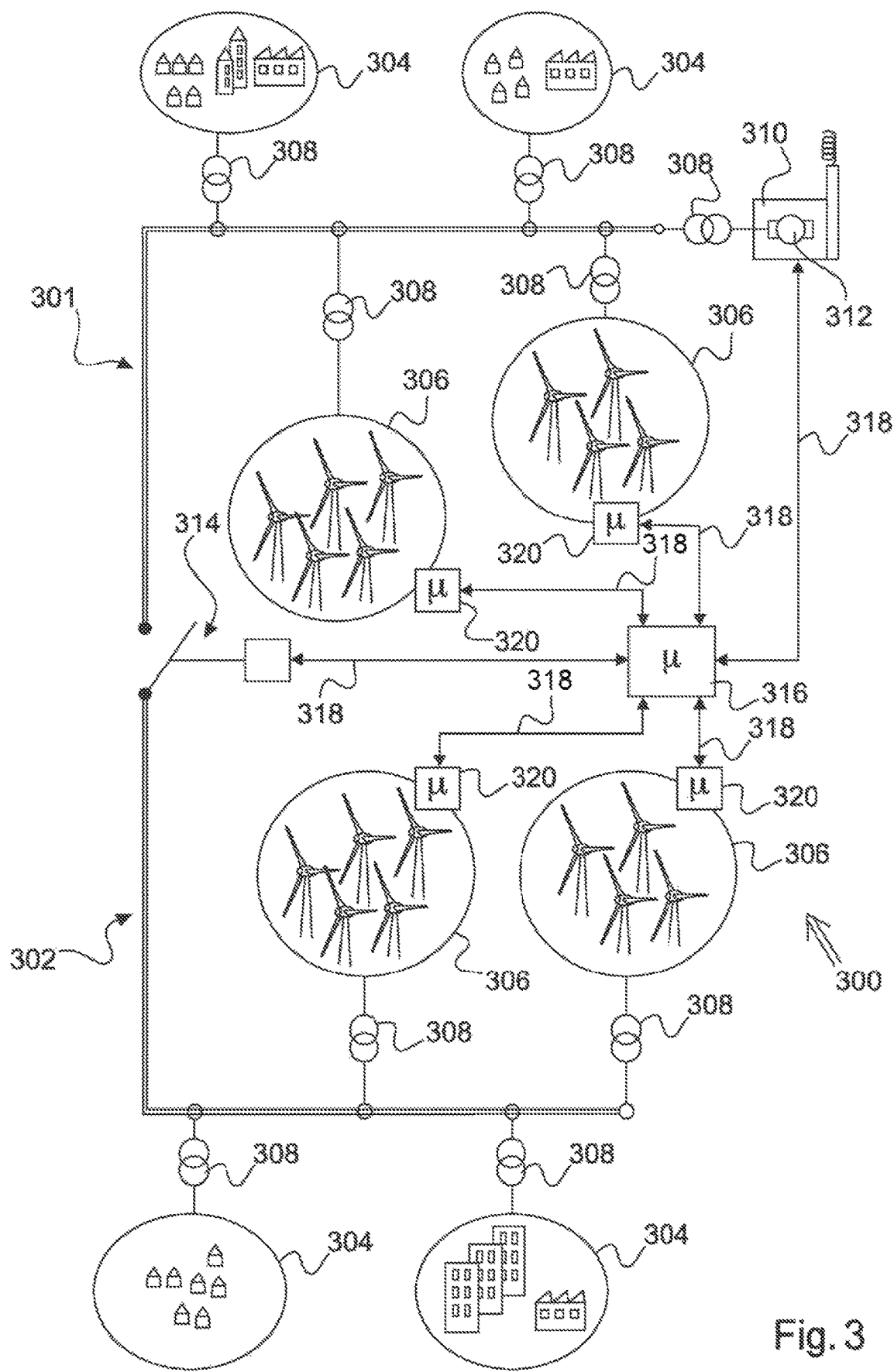
FIG. 3 shows schematically two network sections which are to be connected.

FIG. 3 shows schematically a section of an electric supply network 300. The electric supply network 300 shown in FIG. 3 has at least a first and second subnetwork 301 and 302. Each subnetwork 301 and 302 has some consumers 304 symbolized as urban areas, and also windfarms 306. Particularly the consumers 304 and the windfarms 306 can differ in detail, but this is less relevant here, so that the same reference number is nevertheless used for all consumers 304. The same applies to the windfarms 306 and also the transformers 308 via which power is fed into the electric supply network 300 or one of the subnetworks 301, 302, or via which power is drawn from the electric supply network 300 or the subnetworks 301 302 by the consumers 304. For the first subnetwork 301, a large power station 310 is also shown which similarly feeds into the electric supply network 300, i.e., here into the first subnetwork 301, via a transformer 308. The large power station 310 has a synchronous generator 312 (merely implied here) which is directly coupled to electric supply network 300 or the first subnetwork 301.

FIG. 3 shows the state in which the first and second subnetwork 301, 302 are separated from one another, as indicated by the coupling switch 314 shown as open.

The coupling switch 314 is connected to a central control unit 316, i.e., via a data line 318, via which a two-way data exchange can take place. In particular, the coupling switch 314 can indicate its state to the central control unit 316, i.e., in particular, whether it is open or closed. The central control unit 316 can then transmit a close command to the coupling switch 314 via the data line 318.

The central control unit 316 is connected to the windfarms 306 via further data lines 318 which in each case have the same reference number here for the sake of simplicity. In this respect, the windfarms 306 also represent other converter-controlled generator units. A windfarm computer 320 is provided along with the data line 318 at each windfarm 306 for the data exchange. A data line 318 similarly runs to the large power station 310 in order to be able to exchange data between the central control unit 316 and the large power station 310.

In order to reconnect the two subnetworks 301 and 302, the central control unit 316 initiates a frequency-adapting control. This can be done, for example, in such a way that the command to use a frequency-adapting control is transmitted only to the windfarms 306 of the second subnetwork 302 if the first subnetwork 301 is permanently controlled by the large power station 310. However, it is also conceivable for the central control unit 316 to provide the use of a frequency-adapting control for both subnetworks 301 and 302. If necessary, a reference frequency can also be transmitted.

If the two frequencies of the first and second subnetwork 301, 302 are now frequency-matched, this can be reported back, for example, from the windfarms 306 to the central control unit 316 since the windfarms 306 in any case constantly monitor the frequency. The central control unit 316 can then transmit a signal in each case to the windfarms 306 so that said windfarms switch over to the frequency-maintaining control.

As soon as this switchover to the frequency-maintaining control has been carried out, the central control unit 316 can then give the coupling switch 314 the command to couple, i.e., connect, the two subnetworks 301 and 302. The symbolically shown coupling switch 314 closed accordingly for this purpose. The electric supply network, including the coupling switch 314, is obviously designed as a three-phase network, which is not shown here for the sake of simplicity.

If the coupling switch 314 is then closed and the two subnetworks 301 and 302 then operate essentially stably together as one network, it is then possible to switch back to the normal control function. This can also be controlled by the central control unit 316. The central control unit 316 can initially collect data from the windfarms 306 and the large power station 310 for this purpose. If necessary, however, the central control unit 316 has, for example, its own measurement unit in order to monitor the state of the electric supply network 300.

However, if the electric supply network 300 is then in a stable state following the connection of the two subnetworks 301 and 302, the central control unit 316 can give the windfarms the command to switch back to the normal control function.

Figure 4:
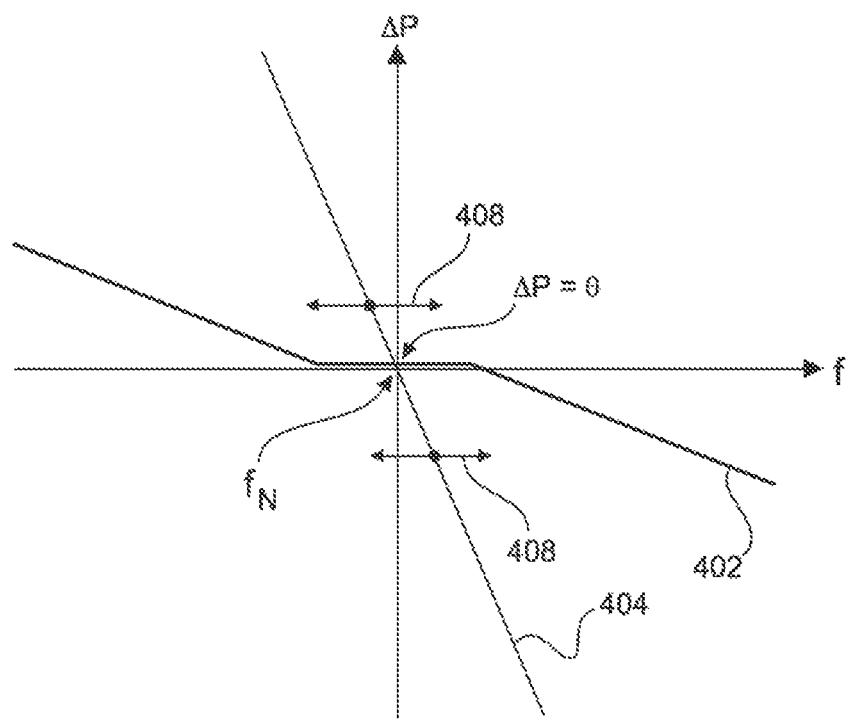
FIG. 4 shows an example of different control functions.

One possibility for implementing a frequency-maintaining control compared with a normal control is shown in FIG. 4. FIG. 4 shows a frequency-dependent power control. A normal control curve 402 and a frequency-maintaining control curve 404 are illustrated for this purpose.

The normal control curve 402 is provided for use as or with the normal control function. The normal control curve 402 has a deadband range 406 which lies evenly around the nominal frequency $f_N$. Outside the deadband range 406, the two branches of the normal control curve 402 rise or fall with a comparatively gentle slope. If the frequency f is therefore close to the nominal frequency $f_N$, no additional active power P is supplied or the currently supplied active power is not reduced.

For the frequency-maintaining control curve 404, it is proposed in this example that no deadband range is provided. A frequency-dependent power increase or reduction therefore takes place immediately with any frequency deviation.

It is furthermore evident that the frequency-maintaining control curve 404 has a significantly higher increase in terms of amount than the normal control curve 402. A comparatively large amount of active power is thus supplied, even in the event of frequency deviations, or is supplemented or reduced compared with the currently supplied active power. If an increase in the active power is provided, said active power can be taken, for example, from the oscillating weight of the rotor of the wind turbine, or an energy store, in particular a battery, is used for this purpose.

Two displacement arrows 408 are further indicated which are intended to illustrate that the frequency-maintaining control curve 404 does not necessarily have to intersect with the frequency axis at the nominal frequency $f_N$. Instead, to provide a basis for adjustment, a frequency present at the time when the switchover to the frequency-maintaining function is performed is used as a frequency reference value.

The implementation of a special network synchronization operating mode for wind turbines or windfarms are provided. Said wind turbines or windfarms can attain or support a steady frequency for this purpose.

It has been recognized that, in the event of a network restoration, the frequency can fluctuate substantially when loads and generators are connected. A necessary unsteady-frequency state can thus prevail.

It has also been recognized that if two established separate networks are to be connected, i.e., synchronized for this purpose, the frequency of the two subnetworks should be matched. Particularly the connection of generators and consumers should then be interrupted and a steady frequency should be declared or predefined at which the frequency should be maintained constant.

According to one design, one of the network islands which is to be connected to a further part of the electric supply network may be a windfarm.

It has been recognized as a further problem that, if a network has very little instantaneous reserve, in particular few rotating weights, the frequency fluctuates even in the event of minor changes in the load and synchronization is impeded.

The following solution is proposed:
maintenance of the frequency in the network for a short time period, more or less at the press of a button.
to do this, a very large oscillating weight can be emulated for a short time period, or a very fast frequency-dependent power control can be activated. In particular, this power control regulates in a positive and negative direction, and the prevailing actual frequency is proposed as a reference frequency.

As an option, a functionality for matching the frequencies in the subnetworks to be synchronized is proposed. One proposal for this purpose is a power adaptation in both subnetworks. The frequencies must therefore be matched in order to achieve a common target synchronization frequency, and for this purpose it can be proposed that the power in one of the subnetworks or in both of the subnetworks is modified in each case so that the frequency concerned changes toward the target synchronization frequency.

An automated procedure is also proposed which successively performs the following steps: fast frequency matching of the networks to be connected then connection of the disconnected network section or connection of the subnetworks and then common operation of the connected subnetworks.

The invention claimed is:

1. A method comprising:
supplying electric power at a network connection point into an electric supply network having a network frequency by a converter-controlled generator unit, the supplying comprising:
supplying the electric power depending on a control function, wherein the electric power comprises active power and reactive power, and
making a selection between a normal control function and a frequency-maintaining control function differing from the normal control function as the control function,
wherein the normal control function is selected if the electric supply network is operating in a normal state,
wherein the frequency-maintaining control function is selected if a steady-frequency operating state is present or is being configured, wherein the steady-frequency operating state represents an operating state of the electric supply network in which the network frequency is to be maintained at a constant value, and
wherein:
supplying the electric power comprises supplying a current having a frequency and a phase,
the frequency and the phase of the supplied current are predefined by a virtual weight rotating at a virtual rotational speed, and
the virtual rotating weight has a settable virtual moment of inertia, and a virtual kinetic energy is stored in the virtual rotating weight according to:

$$E_v = \tfrac{1}{2} J_v \omega_v^2$$

$E_v$ is the virtual kinetic energy, $J_v$ is the virtual moment of inertia, $\omega_v$ is the virtual rotational speed,
the frequency of the supplied current is proportional to the virtual rotational speed,
the virtual kinetic energy is modified depending on a power deviation, and the power deviation quantifies an extent to which the active power is exceeded above an initial active power or above a predefined active power, and
the virtual kinetic energy is modified by an amount of the power deviation integrated over time, and the virtual kinetic energy modifies the virtual rotational speed.

2. The method as claimed in claim 1, wherein the frequency-maintaining control function controls the electric power at least depending on the network frequency of the electric supply network such that the network frequency is supported, wherein the frequency-maintaining control function is configured to support the network frequency more strongly than the normal control function supports the network frequency.

3. The method as claimed in claim 1, wherein:
the frequency-maintaining control function entails an emulation of a behavior of a synchronous machine with the virtual rotating weight with the virtual moment of inertia, and
the virtual moment of inertia is settable.

4. The method as claimed in claim 1, wherein:
the frequency-maintaining control function entails an emulation of a behavior of a synchronous machine with the virtual rotating weight with the virtual moment of inertia, and
the virtual moment of inertia is settable and a greater virtual moment of inertia is set for the frequency-maintaining control function than for the normal control function.

5. The method as claimed in claim 4, wherein the virtual moment of inertia of the frequency-maintaining control function is set in comparison with the normal control function at least to a twofold value.

6. The method as claimed in claim 1, wherein:
an actual frequency is monitored at the network connection point,
a frequency deviation is determined as a deviation of the monitored actual frequency from a reference frequency,
the frequency-maintaining control function predefines a power, which is to be supplied depending on the frequency deviation via a controller function with a settable controller gain, and
the controller gain is predefined such that the network frequency is more strongly supported than through a use of the normal control function.

7. The method as claimed in claim 6, wherein:
the normal control function also predefines a power, which is to be supplied depending on the frequency deviation via the controller function with the settable controller gain, and
wherein the controller gain of the frequency-maintaining control function is set in comparison with the normal control function at least to a twofold value.

8. The method as claimed in claim 6, wherein the reference frequency, a monitored frequency, or a mean value of the network frequency at the network connection point at a time of a switchover to the frequency-maintaining control function is a constant frequency value.

9. The method as claimed in claim 1, wherein:
the frequency-maintaining control function is used for a predefined steady-frequency time period only, and
the predefined steady-frequency time period is less than 1 minute.

10. The method as claimed in claim 1, wherein:
the converter-controlled generator unit comprises or is at least one wind turbine with an aerodynamic rotor,
the frequency-maintaining control function consumes more power than the normal control function to support the network frequency, and additional power is capable of being fed into or drawn from the electric supply network for a steady-frequency time period, and
at least a portion of the additional power is obtained from kinetic energy of the rotor, or is stored as kinetic energy in the rotor.

11. The method as claimed in claim 1, wherein:
a presently prevailing value of the network frequency or a mean value of the network frequency is selected as a frequency reference value in an event of a switchover from the normal control function to the frequency-maintaining control function,
the frequency reference value is specified as a constant value for an entire duration of a steady-frequency time period, and
adjustment to the frequency reference value is performed with the frequency-maintaining control function for the entire duration of the steady-frequency time period.

12. The method as claimed in claim 1, wherein:
the electric supply network is dividable into subnetworks, and
the frequency-maintaining control function is selected if the subnetworks are intended to be connected.

13. The method as claimed in claim 1, wherein:
a frequency-adapting control function is provided to match a frequency of a first subnetwork to a frequency of a second subnetwork, and
the frequency-adapting control function is selected initially following the normal control function in preparation for the steady-frequency operating state in order to carry out the matching of the frequencies, and when the frequencies are matched, to select the frequency-maintaining control function.

14. The method as claimed in claim 13, wherein:
at least the first and second subnetworks are interconnected following the selection of the frequency-maintaining control function, and
the method further comprising:
initially selecting the frequency-maintaining control function following the normal control function in preparation for the steady-frequency operating state,
when first and second frequencies are matched, selecting the frequency-maintaining control function, and
following the selection of the frequency-maintaining control function, interconnecting the first and second subnetworks in an automated manner.

15. The method as claimed in claim 1, wherein a transition function is provided to predefine or control a change from the frequency-maintaining control function to the normal control function and/or from the normal control function to the frequency-maintaining control function, wherein the transition function specifies a time characteristic for changing parameters along the time characteristic.

16. The method as claimed in claim 15,
wherein the transition function predefines a transition time period for the change, wherein the transition time period is in a range from 1 to 10 seconds,
wherein settings or parameters differing over the transition time period between the frequency-maintaining control function and the normal control function change constantly, in each case from their respective values in the frequency-maintaining control function to their respective values in the normal control function, or vice versa, and
wherein respective limit gradients are predefined for the transition time period for the respective changes in at least one of: reactive power outputs or active power outputs of converter-controlled generator units; so that the respective changes of the respective values of at least one of: the reactive power outputs or the active power outputs do not exceed the respective limit gradients.

17. The method as claimed in claim 1, wherein:
the frequency-maintaining control function, the normal control function, and a frequency-adapting control function are selected depending at least on an external request,
wherein the converter-controlled generator unit is configured to receive the external request via an interface.

18. The method as claimed in claim 1, wherein the converter-controlled generator unit switches from a current-impressing mode to a voltage-impressing mode when selecting the frequency-maintaining control function or when a plurality of converter units or inverter units are used.

19. A wind energy system configured to supply electric power as a converter-controlled generator unit at a network connection point into an electric supply network having a network frequency, the wind energy system comprising:
- a supply unit configured to supply the electric power depending on a control function, wherein the electric power comprises active power and reactive power, and
- a control unit in which the control function is implemented, the control unit being configured to make a selection between a normal control function and a frequency-maintaining control function differing from the normal control function as the control function, wherein the control unit is configured to:
  - select the normal control function if the electric supply network is operating in a normal state, and
  - select the frequency-maintaining control function if a steady-frequency operating state is present or is being configured, wherein the steady-frequency operating state represents an operating state of the electric supply network in which the network frequency is to be maintained at a constant value, wherein:
- supplying the electric power comprises supplying a current having a frequency and a phase,
- the frequency and the phase of the supplied current are predefined by a virtual weight rotating at a virtual rotational speed, and
- the virtual rotating weight has a settable virtual moment of inertia, and a virtual kinetic energy is stored in the virtual rotating weight according to:

$$E_v = \tfrac{1}{2} J_v \omega_v^2$$

- $E_v$ is the virtual kinetic energy, $J_v$ is the virtual moment of inertia, $\omega_v$ is the virtual rotational speed,
- the frequency of the supplied current is proportional to the virtual rotational speed,
- the virtual kinetic energy is modified depending on a power deviation, and the power deviation quantifies an extent to which the active power is exceeded above an initial active power or above a predefined active power, and
- the virtual kinetic energy is modified by an amount of the power deviation integrated over time, and the virtual kinetic energy modifies the virtual rotational speed.

20. The wind energy system as claimed in claim 19, further comprising an energy store configured to provide electric energy to perform the frequency-maintaining control function.

21. The wind energy system as claimed in claim 19, further comprising an interface configured to receive at least one request for the selection of the control function.

22. The wind energy system as claimed in claim 19, wherein the wind energy system is a wind turbine or a wind farm.

* * * * *